(12) United States Patent
Erlebacher et al.

(10) Patent No.: US 8,895,206 B2
(45) Date of Patent: Nov. 25, 2014

(54) POROUS PLATINUM-BASED CATALYSTS FOR OXYGEN REDUCTION

(75) Inventors: Jonah D. Erlebacher, Baltimore, MD (US); Joshua D. Snyder, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 333 days.

(21) Appl. No.: 12/920,527

(22) PCT Filed: Oct. 5, 2009

(86) PCT No.: PCT/US2009/059544
§ 371 (c)(1),
(2), (4) Date: Sep. 1, 2010

(87) PCT Pub. No.: WO2010/138138
PCT Pub. Date: Dec. 2, 2010

(65) Prior Publication Data
US 2011/0177432 A1    Jul. 21, 2011

Related U.S. Application Data

(60) Provisional application No. 61/181,795, filed on May 28, 2009.

(51) Int. Cl.
| | |
|---|---|
| *H01M 4/88* | (2006.01) |
| *H01M 4/92* | (2006.01) |
| *H01M 8/10* | (2006.01) |
| *B01J 23/89* | (2006.01) |
| *B01J 35/10* | (2006.01) |
| *H01M 4/98* | (2006.01) |

(52) U.S. Cl.
CPC ............ *H01M 4/921* (2013.01); *B01J 35/1061* (2013.01); *B01J 35/1014* (2013.01); *Y02E 60/50* (2013.01); *H01M 4/98* (2013.01); *H01M 2008/1095* (2013.01); *B01J 23/892* (2013.01); *B01J 35/1009* (2013.01); *B01J 35/1057* (2013.01)
USPC ............ 429/524; 429/487; 429/492; 429/527

(58) Field of Classification Search
USPC .................................. 429/524, 487, 492, 527
See application file for complete search history.

(56) References Cited

U.S. PATENT DOCUMENTS

| | | |
|---|---|---|
| 2003/0186109 A1 | 10/2003 | Huang et al. |
| 2005/0282062 A1 | 12/2005 | Manako et al. |

(Continued)

OTHER PUBLICATIONS

Attard et al., The Preparation of Mesoporous Metals from Preformed Surfactant Assemblies, 1998, Studies in Surface Science and Catalysis, 117, 89-94.*

(Continued)

*Primary Examiner* — Sean P Cullen
(74) *Attorney, Agent, or Firm* — Venable LLP; Henry J. Daley; F. Brock Riggs

(57) ABSTRACT

A porous metal that comprises platinum and has a specific surface area that is greater than 5 m²/g and less than 75 m²/g. A fuel cell includes a first electrode, a second electrode spaced apart from the first electrode, and an electrolyte arranged between the first and the second electrodes. At least one of the first and second electrodes is coated with a porous metal catalyst for oxygen reduction, and the porous metal catalyst comprises platinum and has a specific surface area that is greater than 5 m²/g and less than 75 m²/g. A method of producing a porous metal according to an embodiment of the current invention includes producing an alloy consisting essentially of platinum and nickel according to the formula $Pt_xNi_{1-x}$, where x is at least 0.01 and less than 0.3; and dealloying the alloy in a substantially pH neutral solution to reduce an amount of nickel in the alloy to produce the porous metal.

18 Claims, 5 Drawing Sheets

(56) References Cited

U.S. PATENT DOCUMENTS

| | | | |
|---|---|---|---|
| 2006/0054246 A1 | 3/2006 | Guruswamy et al. | |
| 2006/0166074 A1 | 7/2006 | Pan et al. | |
| 2006/0269824 A1* | 11/2006 | Hampden-Smith et al. | 429/40 |
| 2009/0162725 A1* | 6/2009 | Terazono et al. | 429/33 |
| 2011/0130478 A1* | 6/2011 | Warren et al. | 521/153 |

OTHER PUBLICATIONS

Wakayama et al., Porous platinum fibers synthesized using supercritical fluid, 1999, Chemical Communications, 391-392.*
Travitsky et al., Pt-, PtNi- and PtCo-supported catalysts for oxygen reduction in PEM fuel celss, Jun. 2006, Journal of Power Sources, 161, 782-289.*
Yang et al., Structure and Electrocatalytic Activity of Carbon-Supported Pt—Ni Alloy Nanoparticles Toward the Oxygen Reduction Reaction, Jun. 2004, Journal of Physical Chemistry B, 108, 11024-11034.*
Pugh et al., Electrochemical and Morphological Characterization of Pt—Cu Dealloying, 2005, Journal of the Electrochemical Society, 152, B455-B459.*
Snyder et al., Stabilized Nanoporous Metals by Dealloying Ternary Alloy Precursors, May 2008, Advance Materials, 20, 4883-4886.*
R.R. Adzic, et al. *Top. Catal.* 46, 249 (2007).
J. Erlebacher, *Solid State Physics* 61, 77 (2009).
J. Erlebacher, et al., *Nature* 410, 450 (2001).
T. Fujita, et al., *Appl. Phys. Lett.* 92, 251902 Jun. 23, 2008.
S. Gong, J. Lu, H. Yan, *J. Electroanal. Chem.* 436, 291 (1997).
B. Hammer, J.K. Norskov, *Adv. in Catalysis* 45, 71 (2000).
E. Higuchi, H. Uchida, M. Watanabe, *J. Electroanal. Chem.* 583, 69 (2006).
A. Kowal, et al., *Nature Materials* 8, 325 Jan. 25, 2009.
M. Lefevre, E. Proietti, F. Jaouen, J. Dodelet, *Science* 324, 71 Apr. 3, 2009.
B. Lim, et al., *Science* 324, 1302 Jun. 5, 2009.
H. Liu, et al., *J. Power Sources* 155, 95 (2006).
P. Mani, et al., *J. Phys. Chem.* 112, 2770 Jan. 26, 2008.
N. Markovic, H. Gasteiger, P. Ross, *J. Phys. Chem.* 99, 3411 (1995).
T.P. Moffat, et al., *J. Electrochem. Soc.* 156, B238 Dec. 10, 2008 (2009).
M.T. Paffett, et al., *J. Electrochem. Soc.* 135, 1431 (1988).
U.A. Paulus, et al., *Electrochim. Acta* 47, 3787 (2002).
S. Petegem, S. Brandstetter, R. Maass, A. Hodge, B. El-Dasher, J. Biener, C. Borca, H. Swygenhoven, *Nano Letters* 9, 1158 Feb. 4, 2009.
T.J. Schmidt, et al., *J. Eletrochem. Soc.* 145, 2354 (1998).
Y. Shao-Horn, et al., *Top. Catal.* 46, 285 (2007).
J. Snyder, K. Livi, J. Erlebacher, *J. Electrochem. Soc.* 155, C464 Jun. 23, 2008.
V. Stamenkovic, et al., *Science* 315, 493 (2007).
T. Toda, H. Igarashi, H. Uchida, M. Watanabe, *J. Electrochem. Soc.* 146, 3750 (1999).
J. Wang, N. Markovic, R. Adzic, *J. Phys. Chem. B* 108, 4127 (2004).
J. Wang, J. Zhang, R. Adzic, *J. Phys. Chem. A* 111, 12702 (2007).
C. Xu, et al., *J. Am. Chem. Soc.*, 129, 42 (2007).
J. Zhang, et al., *Science* 315, 220 (2007).
C. Zinola, A. Luna, W. Triaca, A. Arvia, *Electrochim. Acta* 39, 1627 (1994).
International Search Report and Written Opinion for PCT/US2009/059544.

* cited by examiner

POROUS PLATINUM-BASED CATALYSTS FOR OXYGEN REDUCTION

CROSS-REFERENCE TO RELATED APPLICATIONS

This application claims priority to U.S. Provisional Application No. 61/181,795 filed May 28, 2009, the entire content of which is hereby incorporated by reference, and is a U.S. national stage application under 35 U.S.C. §371 of PCT/US2009/059544 filed Oct. 5, 2009 the entire contents of which are incorporated herein by reference.

This invention was made using U.S. Government support under U.S. Department of Energy, Basic Energy Sciences Grant No. DE-FG02-05ER15727. The U.S. Government has certain rights in this invention.

BACKGROUND

1. Field of Invention

The current invention relates to porous metals, and more particularly to porous metal catalysts for oxygen reduction, methods of producing the porous metals and devices that use the porous metals.

2. Discussion of Related Art

All low-temperature proton exchange membrane fuel cells (PEMFCs), such as are envisioned for automotive applications to replace the internal combustion engines, require two catalytic electrodes: one to extract protons and electrons from fuels such as hydrogen or methanol, and one to re-combine these protons and electrons with oxygen to form water. Regardless of the fuel used in low-temperature polymer electrolyte membrane fuel cells (PEMFCs), be it hydrogen (J. Erlebacher, *Solid State Physics* 61, 77 (2009)), methanol (H. Liu, et al., *J. Power Sources* 155, 95 (2006)), or ethanol (A. Kowal, et al., *Nature Materials* 8, 325 (2009)), the primary catalytic bottleneck to the use of these devices are the slow kinetics of the cathodic oxygen reduction reaction (ORR) in which an oxygen molecule is reduced to water via a complex reaction pathway involving four electrons and four protons. Sluggish ORR kinetics accounts for approximately 80% of the losses in PEMFCs (T. Toda, H. Igarashi, H. Uchida, M. Watanabe, *J. Electrochem. Soc.* 146, 3750 (1999)). The most widely used and studied catalyst for the ORR has been Pt, but even on this single-component material the detailed reaction mechanism remains controversial as oxygen reduction on Pt is sensitive to many factors including catalyst crystal surface orientation (N. Markovic, H. Gasteiger, P. Ross, *J. Phys. Chem.* 99, 3411 (1995); C. Zinola, A. Luna, W. Triaca, A. Arvia, *Electrochim. Acta* 39, 1627 (1994)), whether the catalyst form factor is nanoparticulate or bulk metal (E. Higuchi, H. Uchida, M. Watanabe, *J. Electroanal. Chem.* 583, 69 (2006)), and the electrolyte anion species (J. Wang, N. Markovic, R. Adzic, *J. Phys. Chem. B* 108, 4127 (2004)). There are two approaches being pursued to enhance the ORR for fuel cells: (1) the development of catalysts that exhibit only moderate activity when compared to Pt, yet are inexpensive and can be produced in significant quantities (M. Lefevre, E. Proietti, F. Jaouen, J. Dodelet, *Science* 324, 71 (2009)), and (2) developing more Pt-based nanostructured alloy catalysts that, while still perhaps expensive, potentially yield orders of magnitude higher activities than Pt alone via a variety of mechanisms such as changes in the electronic structure, e.g., shifts in the d-band center, leading to more favorable interactions with reactants and products (V. Stamenkovic, et al., *Science* 315, 493 (2007); R. R. Adzic, et al. *Top. Catal.* 46, 249 (2007); B. Hammer, J. K. Norskov, *Adv. in Catalysis* 45, 71 (2000)).

SUMMARY

Some embodiments of the present invention provide a porous metal that comprises platinum. The porous metal has a specific surface area that is greater than 5 m$^2$/g and less than 75 m$^2$/g.

A fuel cell according to an embodiment of the current invention includes a first electrode, a second electrode spaced apart from the first electrode, and an electrolyte arranged between the first and the second electrodes. At least one of the first and second electrodes is coated with a porous metal catalyst for oxygen reduction, and the porous metal catalyst comprises platinum and has a specific surface area that is greater than 5 m$^2$/g and less than 75 m$^2$/g.

A method of producing a porous metal according to an embodiment of the current invention includes producing an alloy consisting essentially of platinum and nickel according to the formula Pt$_x$Ni$_{1-x}$, where x is at least 0.01 and less than 0.3; and dealloying the alloy in a substantially pH neutral solution to reduce an amount of nickel in the alloy to produce the porous metal.

DETAILED DESCRIPTION

Figure 1A:
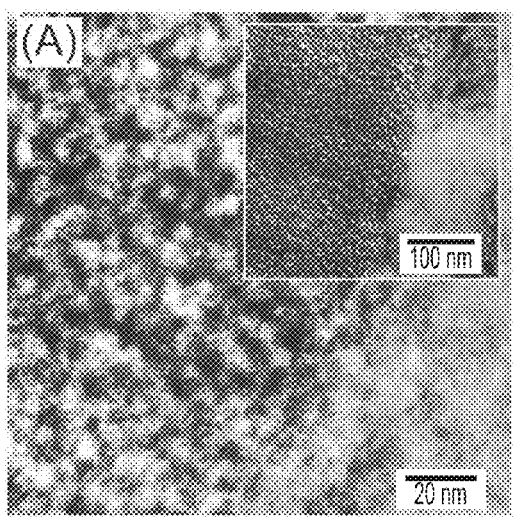
FIG. 1A is a TEM of a wedge slice of a NiPt foil dealloyed in 0.05 M NiSO4 at 1.8 V vs. RHE with residual oxide reduced in an H$_2$/Ar atmosphere according to an embodiment of the current invention. Inset is a lower magnification view showing a sharp interface between the porous dealloyed region (left) and the undealloyed matrix (right).

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited herein are incorporated by reference as if each had been individually incorporated.

Some embodiments of the current invention include novel porous metals comprising platinum. The porous metals have a specific surface area that is greater than 5 $m^2/g$ and less than 75 $m^2/g$. In some embodiments the specific surface area is greater than 40 $m^2/g$ and less than 50 $m^2/g$. In an embodiment of the current invention, the porous metal has a specific surface area of about 44 $m^2/g$. The specific surface area is a measure of the surface area divided by the mass of the material that is useful for providing a measure of the porosity for a fixed mass. The greater the porosity of a solid, the greater the specific surface area.

In some embodiments, the porous metal is a porous metal alloy that further includes nickel. In further embodiments, the porous metal is a porous metal alloy that consists essentially of platinum (Pt) and nickel (Ni). For example, the porous metal can be a porous metal alloy further satisfying the following formula $Pt_xNi_{1-x}$, where x is at least 0.6 and as large as 1. In the case in which x is equal to 1, all (or substantially all) Ni has been dealloyed leaving none behind in the resulting porous metal. In an embodiment of the current invention that has been found to be suitable for some applications, the porous metal is about 67 at % platinum and 33 at % nickel (i.e., x is about 67). In this example, the porous metal has a density of about 8 $g/cm^3$. However, the invention is not limited to this particular embodiment. Furthermore, an increase or decrease of a couple of at % is also suitable for particular applications. In other embodiments, much less nickel remains, including an embodiment in which essentially no nickel remains in the porous metal.

The porous metal can be a porous metal alloy that also includes at least one of titanium, iron, cobalt, nickel, copper, iridium, rhenium, aluminum, manganese, palladium, osmium, rhodium, vanadium, chromium in addition to platinum.

The porous metal according to some embodiments of the current invention has an ensemble average pore diameter that is less than about 10 μm. Although the pores may not be perfectly tubular, they can be characterized by an effective diameter. In some embodiments, porous metal has an ensemble average pore diameter that is less than 100 nm. In further embodiments, the porous metal has an ensemble average pore diameter that is greater than 1 nm and less than 50 nm. In further embodiments, the porous metal has an ensemble average pore diameter that is greater than 1 nm and less than 4 nm. In still further embodiments, the porous metal has an ensemble average pore diameter that is greater than 2 nm and less than 3 nm and an average ligament diameter that is greater than 2 nm and less than 3 nm. A porous metal of this kind has solid ligaments, and void in-between them. The ligament diameters and pore diameters are approximately the same, and the ranges of one are the ranges of the other.

Porous metals according to some embodiments of the current invention can provide a catalyst for oxygen reduction. An embodiment of the present invention includes a novel nanoporous metal (np-NiPt) formed by electrochemical dealloying of Ni-rich Ni/Pt alloys. The np-NiPt according to this embodiment of the current invention magnifies the ORR activity of the base, non-porous alloy by trapping the reactants within a highly porous matrix. The effect can lead to dramatic improvements in the electrochemical half-wave for the ORR, the open circuit potential, the current stability, and the performance in hydrogen fuel cells compared to conventional nanoparticle-based catalysts.

The new nanoporous Pt-based catalyst according to this embodiment of the current invention is formed by electrochemical dealloying of $Pt_xNi_{1-x}$ alloys (x<0.25). The $Pt_xNi_{1-x}$ alloys exhibit large, voltage-dependent magnification of the ORR activity compared to non-porous catalysts such as Pt nanoparticles, especially at low and moderate overpotentials. The new material is easily processed into unsupported catalytic powders according to some embodiments and integrated into high-performance hydrogen/oxygen PEMFCs.

Nanoporous Ni/Pt (np-NiPt) according to an embodiment of the current invention was fabricated by selective electrochemical dissolution (dealloying) of Ni from Ni-rich base alloys made by bulk solidification. From a thermodynamic standpoint, the Pt/Ni system should be a good dealloying candidate because the components form a uniform solid solution with the face-centered cubic crystal structure across their entire composition range, and because Pt is much more noble than Ni; both of these characteristics together can lead to nanoporosity evolution during dissolution due to a kinetic instability that competes with dissolution of the less-noble alloy component with surface diffusion of the remaining component (J. Erlebacher, et al., *Nature* 410, 450 (2001)). In practice, however, the Ni/Pt system exhibits some complications. First, thermal processing of the base material often results either in segregation of Pt to the surface to form a passivating skin (T. Toda, H. Igarashi, H. Uchida, M. Watanabe, *J. Electrochem. Soc.* 146, 3750 (1999); V. Stamenkovic, et al., *Science* 315, 493 (2007)), or in Ni-rich alloys, the formation of a passivating nickel oxide (M. Pourbaix, *Atlas of Electrochemical Equilibria in Aqueous Solutions* (Pergamon Press, Oxford, N.Y., 1966)). These problems were overcome by dealloying in neutral electrolyte at high potentials, greater than 2.1 V (all potentials here are reported versus the reversible hydrogen electrode, RHE). At these potentials, we suspect there is enough electrochemical driving force to break through any passivation layer. Once broken-through, exposed Ni is susceptible to dissolution. Chemical dissolution is assisted by acidification of the electrolyte in the vicinity of the etch front by hydrolysis of the surface Ni to a nickel hydroxide ($Ni(OH)_2$); $Ni(OH)_2$ is soluble in the acidified pores, but precipitates out of solution when it diffuses into the bulk of the neutral electrolyte. Copious amounts of $Ni(OH)_2$ are usually collected during the course of dealloying at the base of the electrolyte vessel. Dealloying in the Ni/Pt system can also be done in acidic solutions, but the neutral solutions used here are benign. More importantly, in neutral solutions, acidification of the electrolyte which generates the reduced species that participate in surface diffusion and porosity evolution is confined to the moving dissolution front (J. Snyder, K. Livi, J. Erlebacher, *J. Electrochem. Soc.* 155, C464 (2008)); behind the dissolution front, the material forms a surface oxide that morphologically stabilizes the nanoscale porosity. Dealloying was found to occur in alloys with Pt contents as low as 1% Pt, but good structurally stable porosity evolution were found to occur for compositions of Pt between 15-25%, of which the optimal ORR activity was centered at 20 at. % Pt.

Figure 1B:
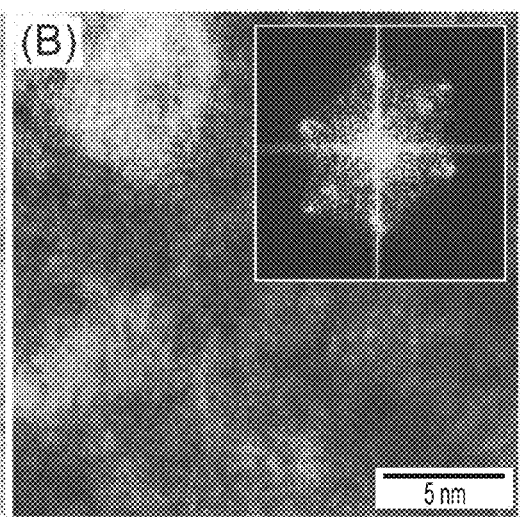
FIG. 1B is a high resolution TEM of a dealloyed section corresponding to FIG. 1A with visible lattice fringes. The Fourier transform of this image in the inset confirms that np-NiPt is an extended crystalline network.

FIGS. 1A and 1B contain cross-sectional transmission electron microscope (TEM) micrographs of np-NiPt generated from dealloyed $Ni_{80}Pt_{20}$ foils after the residual surface oxide had been reduced in dilute sulfuric acid. Pores with diameters of approximately 2-3 nm are clearly visible in FIG. 1A, while from the inset it can be seen that the interface between the dealloyed layer and the bulk metal is fairly sharp.

FIG. 1B is a high resolution TEM of np-NiPt in which the lattice fringes are visible and the Fourier transform inset shows that the dealloyed structure is an extended crystalline network with a pore size orders of magnitude smaller than the grain size (here~50 microns), a typical feature of dealloyed nanoporous metals (S. Petegem, S. Brandstetter, R. Maass, A. Hodge, B. El-Dasher, J. Biener, C. Borca, H. Swygenhoven, *Nano Letters* 9, 1158 (2009)). Elemental analysis of the porous region gave a composition of 32 at. % Ni and 68 at. % Pt, an approximately 70% void fraction. Hydrogen underpotential deposition ($H_{UPD}$) on fully dealloyed foils yielded a Pt surface area of ~44 $m^2 g^{-1}$, similar to nanoparticle catalysts and consistent with the highly porous geometry.

Dealloying is increasingly being used to modify the structure and composition of alloy nanoparticles in order to increase their activity toward the ORR. The Cu—Pt system (P. Mani, et al., *J. Phys. Chem.* 112, 2770 (2008)) has been extensively studied. In the case of nanoparticles, the particle facet boundaries of the particle are low-coordination surface sites, because the surface curvature is always positive. As a result, the mobility of Pt atoms during dealloying leads to the formation of nanoparticles comprised of a Pt skin and an alloy core that is smaller than the original particle size and possesses no porosity. In contrast, dealloying of the bulk NiPt alloys here did not lead to any obvious volume change, an effect likely due primarily to the stabilizing surface oxide formed during dealloying. The resultant porous morphology of the structure contains both positive and negative curvature regions, and an extremely high density of low-coordination surface sites compared to the roughly spherical morphology of typical nanoparticles. The high density of low-coordination sites are being implicated in the usually high activity of nanoporous gold toward CO oxidation (C. Xu, et al., *J. Am. Chem. Soc.*, 129, 42 (2007)), and the structurally analogous sites here may be playing a role in the activity as well. Notably, while there is a large interior volume of this porous material, the diffusional mean free path is limited by the pore size, i.e., only a couple nanometers. Thus, reactants that get deep into the porous structure may become trapped, and will collide with pore walls many times before they either react or escape. Particular to the ORR, the resulting product is water, which will act as an electrolyte assisting in protonic transport at active catalyst sites, eliminating the concern that the pores could become clogged with reaction products.

Oxygen reduction on np-NiPt was measured in oxygen saturated 0.1 M $HClO_4$ perchloric acid ($HClO_4$) solutions at 298 K using a rotating disk electrode (RDE). The four electron reduction of water $O_2+4H^++4e^- \rightarrow 2H_2O$ has an equilibrium potential of ~1.23 V at room temperature but, as this reaction is kinetically complex, it only exhibits significant current under more reducing conditions, i.e., at the application of a less positive potential. The difference in actual potential required to drive the ORR and the equilibrium potential is known as the activation overpotential, and a rough measure of oxygen reduction activity is the overpotential associated with the half-wave of the oxygen reduction current. A typical experiment to assess ORR activity is to vary at a set rate (e.g., 50 mV/s) the electrochemical potential on the sample versus a reference electrode, and measure the (negative) electrical current passed through the sample at each voltage; this is associated with passing electrons out of the material and into the oxygen molecules being reduced (T. P. Moffat, et al., *J. Electrochem. Soc.* 156, B238 (2009). For the highly porous samples here, potentiodynamic scanning usually leads to the formation of a capacitive double-layer in addition to the ORR current, the former being a small non-Faradaic charge transfer not associated with any chemical reaction. To avoid this effect, the ORR activity was measured by holding the potential at fixed values and looking for the steady-state current. This value usually stabilized within a couple of seconds. Notably, if this potentiostatic measurement is made on nanoparticle or single crystal catalysts, the current tends to decay, as these surfaces easily become contaminated; in contrast, we saw no appreciable current decay in the ORR current for np-NiPt over hundreds of seconds.

Figure 2A:
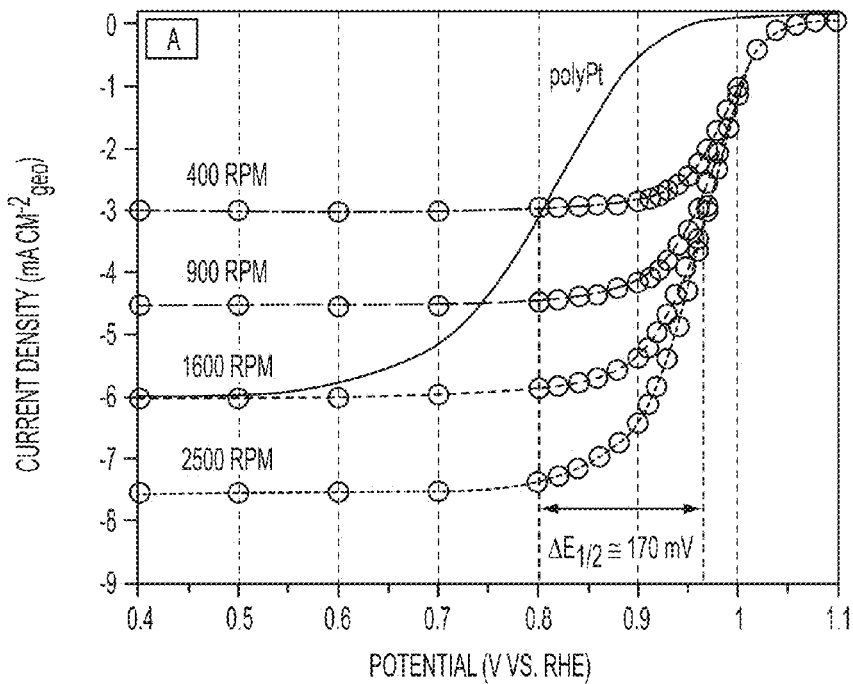
FIG. 2A provides potentiostatic ORR curves for np-NiPt at four different rotation rates in oxygenated 0.1 M HClO$_4$ according to an embodiment of the current invention (electrode surface area as determined by H$_{UPD}$ is 28 cm$^2$). Also included is a potentiodynamic ORR curve for polycrystalline Pt at 1600 rpm and scan rate 100 mV/s.
Figure 2B:
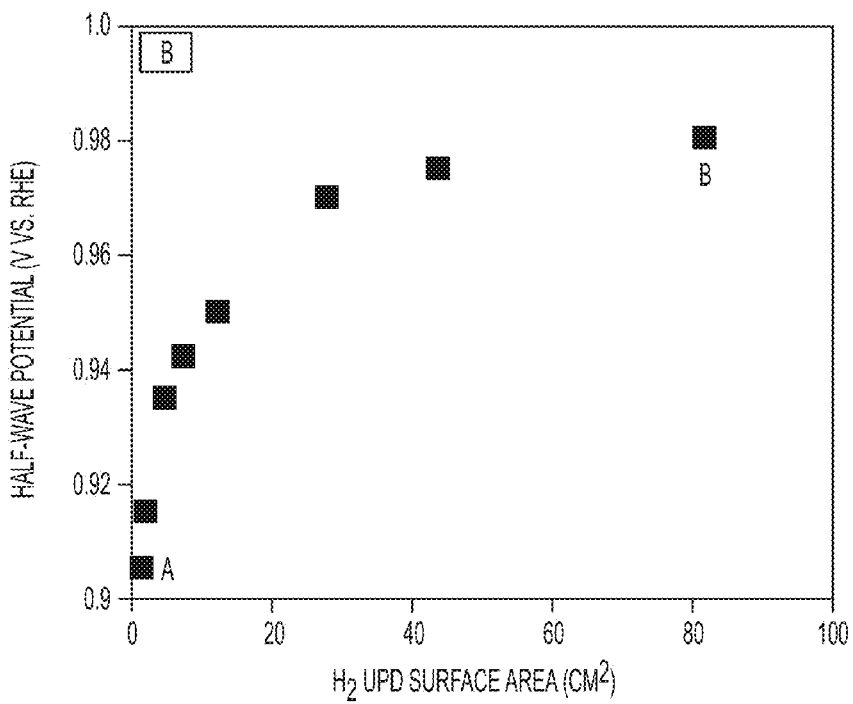
FIG. 2B shows the surface area calculated through integration of the H$_{UPD}$ region of cyclic voltammetry curves plotted versus the corresponding half-wave potential from ORR experiments for sample of varying dealloyed depth.

FIG. 2A shows the oxygen reduction current measured potentiostatically at different rotation rates for a typical dealloyed sample, here dealloyed to a depth of approximately 550 nm. Depths were approximated by considering the void fraction and density of the porous structure and the surface area calculated from the current associated with the underpotential deposition (UPD) of a monolayer of hydrogen between voltages of 0.05 V-0.4 V, a standard method for estimating the surface area of a Pt skin material. The roughness factors (hydrogen UPD surface area A/geometric surface area $A_G$) of these samples examined in this study varied from 6.7 (~25 nm depth) to 419 (~1600 nm depth), shown in FIG. 2B. The electrode represented by the data in FIG. 2A has a half-wave of 0.97 V, greater than the half-wave potential for the most active material for oxygen reduction, namely single crystals of $Pt_3Ni$ at 333 K (0.93 V) (V. Stamenkovic, et al., *Science* 315, 493 (2007)). Pt(111), a standard for oxygen reduction, has a half wave for the ORR at ~0.86 V (J. Wang, J. Zhang, R. Adzic, *J. Phys. Chem. A* 111, 12702 (2007)), a nearly 100 mV higher overpotential than np-NiPt. Polycrystalline Pt, which exhibits the polyfacetted orientations found in real Pt nanoparticle catalysts, has an even lower half-wave of approximately 0.81 V; our own measurement for the half-wave of poly-Pt is also shown in FIG. 2A for comparison. Overall, the half-wave for the ORR rises from 0.91 V to 0.98 V with increasing dealloying depth, also shown in FIG. 2B. Large positive shifts in the half-wave for the ORR have not been seen on rough but non-porous Ni/Pt alloys with similar residual composition (U. A. Paulus, et al., *Electrochim. Acta* 47, 3787 (2002)), implicating morphological nanoporosity in playing a central role in the increased activity in np-NiPt.

The RDE current i is a convolution of the intrinsic kinetic current density $j_K$ associated with the surface reactivity per catalyst surface area and the diffusion limited current density $j_D$ associated with the formation of a rotation-rate dependent diffusional double layer above a disk with geometric area $A_G$:

$$\frac{1}{i} = \frac{1}{A j_K} + \frac{1}{A_G j_D}. \quad (1)$$

With np-NiPt, the measured current always reaches the theoretical diffusion limited current density (T. P. Moffat, et al., *J. Electrochem. Soc.* 156, B238 (2009)), so there are no additional terms associated with a secondary resistance through a (e.g., macroporous) reactive medium to the catalytic sites (T. J. Schmidt, et al., *J. Eletrochem. Soc.* 145, 2354 (1998)). All other factors remaining constant, when the active surface area A increases, the half-wave for oxygen reduction shifts to more positive potentials, as demonstrated by Adzic, et al (J. Zhang, et al., *Science* 315, 220 (2007)). In dealloyed Pt-based alloys, the active surface area has been equated to the hydrogen UPD surface area (M. T. Paffett, et al., *J. Electrochem. Soc.* 135, 1431 (1988)). This correlation may be valid for moderately rough surfaces, but in the case of a highly porous material, it neglects that reactants trapped within the porous network may interact with the catalytic surface multiple times before escaping into the bulk of the electrolyte.

With a highly porous material, it is reasonable that at high overpotentials, the catalytic reaction will proceed after the reactants have diffused only a shallow depth into the porous network, yielding an effective active surface area approximately equal to the geometric surface area, whereas at low overpotential, the effective active surface area may be much larger than the geometric surface area. In short, the active surface of a nanoporous material should itself be a function of the overpotential. Estimation of the actual reactive surface area is complex, as are all coupled reaction/diffusion problems, and relies on detailed knowledge of the potential-dependent surface composition. The porous microstructure and topology of dealloyed nanoporous metals are only beginning to be clarified in a few model systems (T. Fujita, et al., *Appl. Phys. Lett.* 92, 251902 (2008)), and is an added degree of complexity over nanoparticulate catalysts.

Figure 2C:
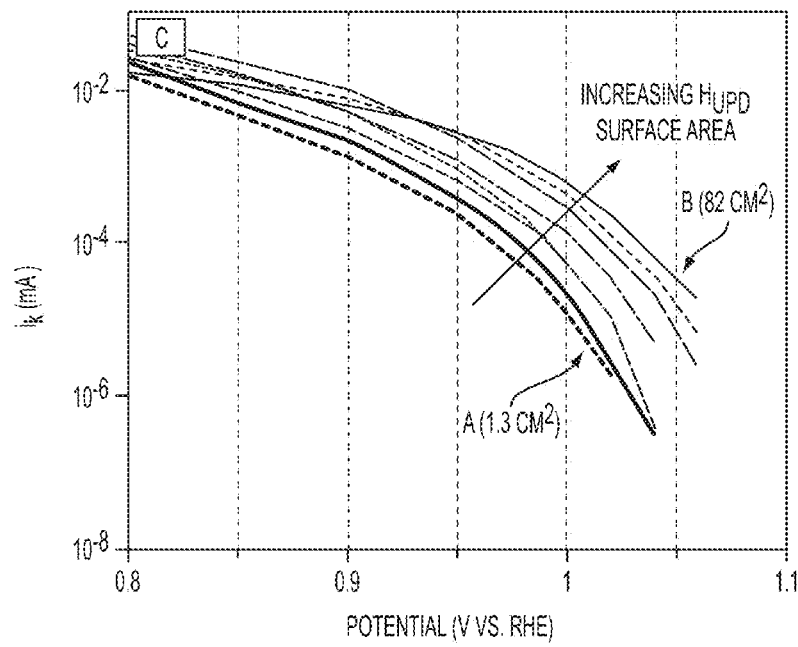
FIG. 2C shows the corresponding kinetic current curves for each dealloyed depth plotted versus potential.

When the kinetic current of np-NiPt is calculated using either Eq. (1) or Koutecky-Levich analysis, and the hydrogen UPD area is used as a potential-independent fixed factor for A, the kinetic current density decreases with increasing area at all potentials. This observation may be interpreted to mean that the intrinsic reactivity of the material is decreasing with greater dealloying depth, but because the composition and morphology of the material does not change with increasing dealloying depth, we reject this possibility. A more reasonable explanation is that the intrinsic reactivity per unit surface area remains constant, and that the effective reactive surface area A is varying with potential. In FIG. 2C, we plot the kinetic current ($i_K = Aj_K$) for representative samples of varying hydrogen UPD surface area. Clearly, the kinetic current is converging at voltages below ~0.8 V, where the ORR current becomes diffusion-limited. At these high overpotentials, the kinetic current curves for the deeply dealloyed samples cross the shallower dealloyed samples, an effect we believe may be due to a smaller amount of residual surface nickel near the outermost geometric surface in the highly dealloyed samples. At low overpotentials, higher kinetic currents are correlated to higher surface areas. It is apparent that deeper porosity more effectively traps reactants, allowing oxygen to be reduced more effectively at lower potentials.

Figure 2D:
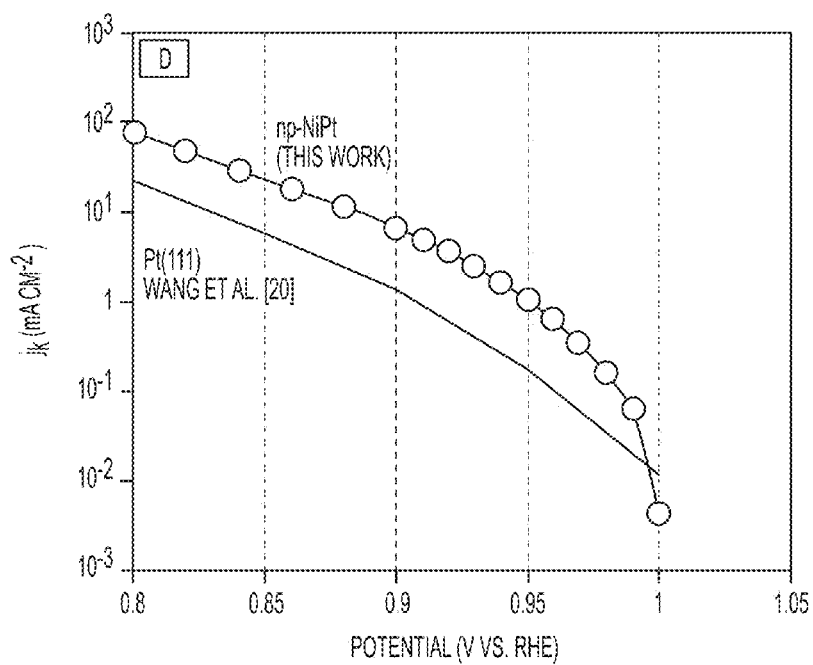
FIG. 2D provides, using the data in FIG. 2C, the current at each potential extrapolated to the geometric surface area of the disk and the current density calculated with this area plotted versus potential. The resulting curve is compared to model data for Pt(111) from J. Wang, J. Zhang, R. Adzic, *J. Phys. Chem. A* 111, 12702 (2007).

We estimate an upper bound to the intrinsic kinetic current density of np-NiPt by linear interpolation of the RDE kinetic current data in FIG. 2C to the geometric area of the RDE; the results are shown in FIG. 2D. There is certainly an error associated with this extrapolation, but the results are unlikely incorrect by even a factor of two, as the extrapolations otherwise look wildly incorrect. The intrinsic kinetic current density vs. potential of np-NiPt is similar in magnitude to highly reactive clean Pt(111) (also plotted in FIG. 2D); at 0.9 V, the kinetic current density is ~7 mA/cm$^2$, a factor of ~3× over Pt(111) (J. Wang, N. Markovic, R. Adzic, *J. Phys. Chem. B* 108, 4127 (2004)), a factor of ~40× over conventional carbon supported Pt nanoparticles, and a factor of ~16× over the recently discovered PdPt dendrite catalysts (B. Lim, et al., *Science* 324, 1302 (2009)). At 0.9 V, the actual kinetic current is further magnified by an ~7× factor due to the presence of nanoporosity, a combined increase of ORR activity greater than 250× compared to conventional supported Pt nanoparticles.

It is interesting to note that Pt nanoparticles supported on carbon (integrable in PEMFCs) exhibit an intrinsic activity for the ORR that is below that of the model Pt(111) surface by a factor of 10, due perhaps to polyfacetting or to nanoscale curvature effects. Here, the intrinsic reactivity of np-NiPt is, within error, the same factor lower than well-prepared single crystal NiPt$_3$(111) (~18 mA/cm$^2$), which possesses approximately the same composition and currently exhibits the highest activity toward the ORR yet discovered (V. Stamenkovic, et al., *Science* 315, 493 (2007)). Notably, the residual Ni in the bulk of np-NiPt is important to increase reactivity. The average bulk residual Ni fraction is ~0.3, but an assay of the residual surface via electrochemical cycling in dilute NaOH, for which there is a characteristic peak associated with the formation of Ni(OH)$_2$, shows that there is only a small amount of surface Ni, and the surface fraction of Ni decreases with further dealloying depth. Therefore, np-NiPt falls into the category of Pt-skin catalysts (to which NiPt$_3$(111) belongs), where the reactivity is thought to be due to shifts in the d-band center of a Pt-skin covering an alloy bulk. Theoretical predictions suggest Ni/Pt Pt-skin catalysts should be very effective for ORR (V. Stamenkovic, et al., *Science* 315, 493 (2007)). Agreeing with this prediction, we have examined dealloyed Cu/Pt nanoporous alloys for the ORR, but have not obtained substantial increases in activity; assessment of the ORR on dealloyed Cr/Pt also reported no substantial increases (M. T. Paffett, et al., *J. Electrochem. Soc.* 135, 1431 (1988)).

According to some embodiments of the current invention, the novel porous metals can provide a catalyst to be integrated into an operational fuel cell. For example, a simple calculation suggests that np-NiPt should be advantageous to use in fuel cell cathodes. Typical fuel cells leverage the high surface area to volume of 3-5 nm diameter nanoparticles to gain activity from a limited amount of Pt. Particles of np-NiPt must obviously be larger than the pore size, i.e., at least tens of nanometers in diameter. At high overpotential (below ~0.7 V) diffusion and mass transport are limiting meaning that only the outer surface of the catalyst particles participate in ORR. In this case, the difference in active surface area between a 5 nm diameter Pt particle and a 50 nm diameter np-NiPt particle will be approximately 100. But this factor could be compensated for by the increase in the intrinsic reactivity (kinetic current) of the material coupled with the magnification of activity associated with nanoporosity, and at lower overpotential, the increased activity should be even more readily apparent. Using non-nanoparticulate np-NiPt would potentially have some other advantages over supported nanoparticles: larger particles would not be prone to nanoparticle-radius dependent corrosion, and particle agglomeration due to diffusion or dissolution of the carbon supports (absent here), may be eliminated as well (Y. Shao-Horn, et al., *Top. Catal.* 46, 285 (2007)).

Figure 3:
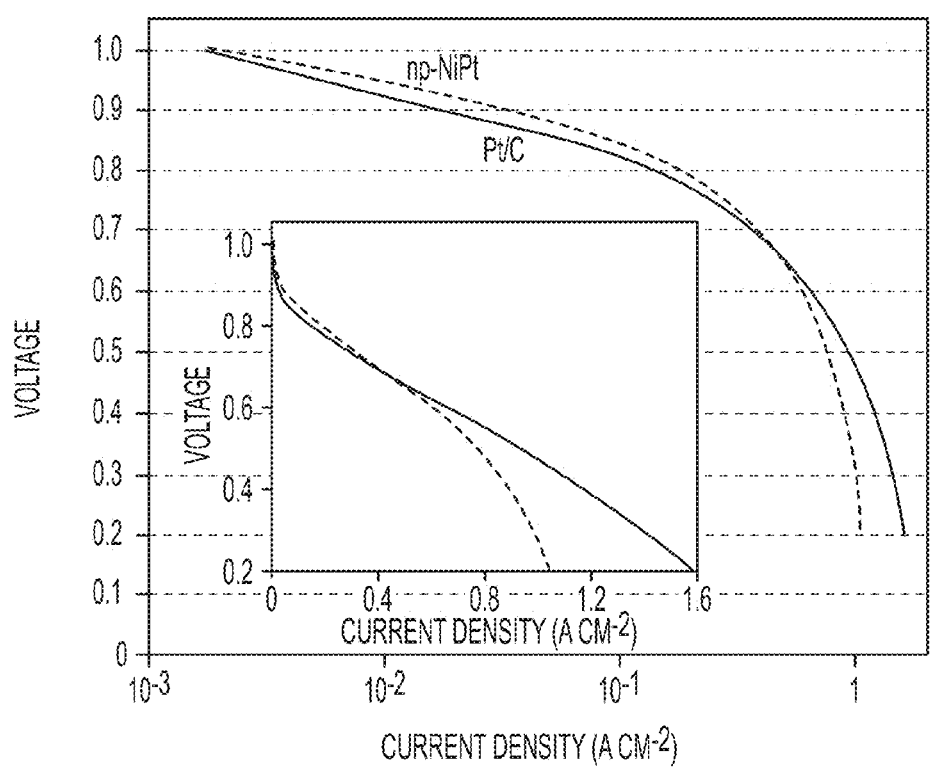
FIG. 3 shows fuel cell polarization curves for MEAs composed of Pt/C anodes and either Pt/C (blue curve) or np-NiPt (red curve) cathodes. The fuel cell was operated with a temperature of 80° C. and hydrogen and oxygen humidification tank temperatures of 90° C.

To test the efficacy of np-NiPt in hydrogen/oxygen PEM fuel cells, membrane electrode assemblies (MEAs) using unsupported np-NiPt were fabricated by hot-pressing catalyzed decals onto Nafion 115. The anode was loaded with Pt/C (E-TEK 40 wt. % Pt on carbon) and the cathode was loaded with np-NiPt; both cathode and anode had a catalyst loading of 0.5 mg/cm$^2$. In order to make a catalyst powder, np-NiPt dealloyed foils were ground by ball milling resulting in particle diameters of about 200 nm. The catalyst layers were made by conventional means—forming an ink with the catalyst by mixing it with both Nafion ionomer to promote proton transport and a carbon black powder to promote electrical conductivity that is painted onto transfer decals. After transfer of the catalyst layer from the decal to the Nafion membrane, carbon fiber gas diffusion layers (GDLs) with microporous, hydrophobic carbon coatings were pressed on either side of the membrane to complete the MEA. FIG. 3 shows polarization (current/voltage) characteristics of two different MEAs. When np-NiPt is used for the cathode catalyst, there is an improvement in open circuit potential (to approx. 1.1 V), and there is also an increase in the current density (and power) down to approximately 0.7 V when compared to the MEA with the standard Pt/C cathode. This behavior is in agreement with the half-cell behavior, and is particularly remarkable because the catalyst is unsupported, and in situ hydrogen UPD adsorption shows only a ⅓ utilization of the catalyst surface area. At higher current densities, the drop-off in cell voltage is likely due both to loss of reactivity and to mass-transport limitations, likely associated with the unoptimized catalyst layer morphology; even so, these are very stable cells and operate with no loss in power running continuously for 10,000 seconds at 200 mA/cm². Further increases in cell performance are seen at low overpotentials when np-NiPt is used as both the cathode and anode, suggesting the material is also highly active for hydrogen oxidation. The advantages of higher np-NiPt activity at higher voltages and the reduced mass transport limitations of Pt/C at higher current densities may be simultaneously realized by a proper optimization of a mixed np-NiPt and Pt/C catalyst. These initial results demonstrate the high activity of np-NiPt in operational fuel cells, and suggest morphological optimization of the catalyst layer, either through the use of smaller catalyst particles or different ink compositions to better integrate the supportless catalyst, can lead to further improvement in the fuel cell performance.

Figure 4:
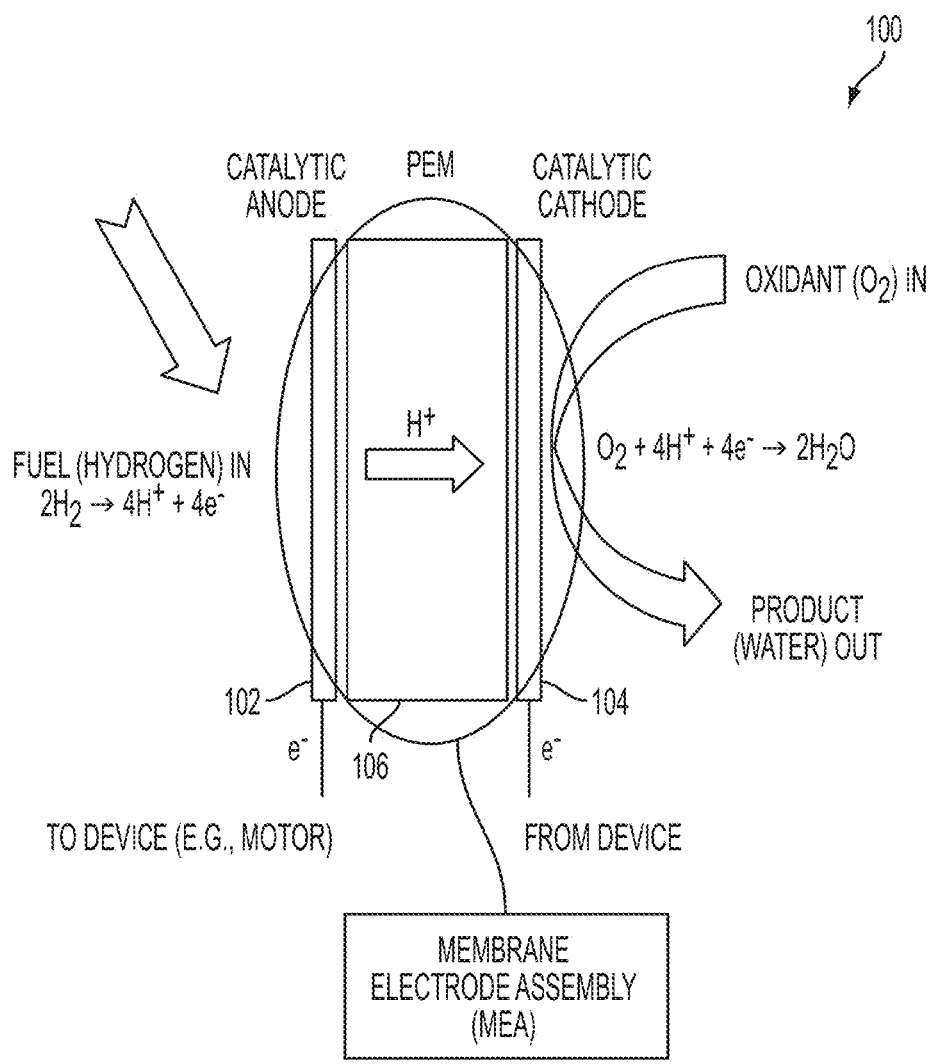
FIG. 4 is a schematic illustration of a fuel cell according to an embodiment of the current invention.

FIG. 4 is a schematic illustration of a fuel cell 100 according to an embodiment of the current invention. The fuel cell 100 has a first electrode 102, a second electrode 104 spaced apart from the first electrode 102, and an electrolyte 106 arranged between the first electrode 102 and the second electrode 104. At least one of the first electrode 102 and the second electrode 104 is coated with a porous metal catalyst for oxygen reduction. The porous metal catalyst comprises platinum and has a specific surface area that is greater than 5 m²/g and less than 75 m²/g. In some embodiments the specific surface area is greater than 40 m²/g and less than 50 m²/g. In an embodiment of the current invention, the porous metal has a specific surface area of about 44 m²/g. The novel porous metals described in various embodiments above can be used as the porous metal catalyst for fuel cells according some embodiments of to the current invention. In some embodiments, the porous metals can be, but are not limited to, particulate, film or foil structural forms. The electrolyte 106 can be a solid electrolyte, for example, selected from currently available solid electrolytes used in fuel cells. However, other electrolytes may be selected according to the particular application. The first electrode 102, the second electrode 104 and the electrolyte 106 can provide a membrane electrode assembly (MEA) portion of the fuel cell 100. The fuel cell can include a plurality of MEAs as well as additional structures such as fuel input and exhaust structures that are only represented schematically in FIG. 4.

Another embodiment of the current invention is directed to a method of producing a porous metal that includes producing an alloy consisting essentially of platinum and nickel according to the formula $Pt_xNi_{1-x}$, where x is at least 0.01 and less than 0.3, and dealloying the alloy in a substantially pH neutral solution to reduce an amount of nickel in the alloy to provide the porous metal. This method can be used, for example, to produce at least some of the novel porous metals of the current invention.

Synthesis Procedure

NiPt alloys were made by co-melting Ni (99.5%, Alfa Aesar) and Pt (99.997%, Alfa Aesar) in the desired ratio in a radio frequency induction (RF) furnace (Ameritherm Easy-Heat) followed by an eight hour anneal in vacuum at 950° C. (Barnstead-Thermolyne 1500). After homogenization, the alloys were milled into a disk with a diameter of 0.196 cm² and polished down to a mirror finish with 4000 grit silicon carbide paper (Leco). After polishing, the disks were again annealed in vacuum at 950° C. to remove stresses associated with machining and polishing. Annealed disks were placed in the rotating disk electrode apparatus (Pine Instruments, AFMSCRE) and dealloyed in 0.05 M $NiSO_4$ (hexahydrate, 99.97%, Alfa Aesar) with an applied potential of 2.1 V vs. RHE using a Gamry potentiostat. During dealloying at this potential oxygen was evolved, the electrode was rotated at 1600 rpm to assist in its removal. The reference electrode and counter electrode were SCE (Radiometer Analytical) and Pt mesh respectively. The reference electrode was calibrated against a hydrogen electrode fabricated according to the specifications in (S. Gong, J. Lu, H. Yan, *J. Electroanal. Chem.* 436, 291 (1997)). Nitrogen was bubbled through a 0.1 M $HClO_4$ (70%, Sigma Aldrich, redistilled 99.999%) solution for at least 30 min. in order to remove any trace dissolved oxygen. Both the hydrogen electrode and SCE were placed in the solution and the voltage between them was measured to be 0.3089 V, similar to that found in (T. P. Moffat, et al., *J. Electrochem. Soc.* 156, B238 (2009)). The SCE offset from the hydrogen reference potential was further confirmed by multiple comparisons to other reference electrodes, as well as to the positions of characteristic peaks for $H_{UPD}$ and Pt oxidation/reduction (V. Stamenkovic, et al., *Science* 315, 493 (2007); T. P. Moffat, et al., *J. Electrochem. Soc.* 156, B238 (2009)). After dealloying the desired amount, the electrode was washed thoroughly by rotating in Millipore water (MilliQ Synthesis A10) with a resistivity greater than 18.2 MΩ cm. Millipore water was also used for all electrolyte solutions. As a consequence of dealloying in a neutral pH solution, there is considerable residual oxide on the surface of the electrode. This oxide is reduced by cycling in deoxygenated 0.1 M $H_2SO_4$ (concentrated, ACS plus reagent, Fisher Scientific) from a potential of 1.2 V to 0 V vs. RHE at 50 mV s⁻¹. $H_{UPD}$ surface areas of the samples were calculated from these curves. For ORR measurements, the electrode was again thoroughly rinsed in Millipore water and transferred to oxygen saturated $HClO_4$ (70%, Sigma Aldrich, redistilled 99.999%) of the desired concentration; proton concentration is checked using a calibrated pH meter (Corning Scholar 415). ORR curves were obtained potentiostatically by fixing the potential until a steady current value was obtained ($O_2$ was continuously bubbled through the solution to maintain $O_2$ saturation), thus limiting the effect that non-Faradaic currents ubiquitous in porous metals associated with non-zero sweep rate can have on current measurements. Four different rotation rates were used 400, 900, 1600 and 2500 rpm. All glassware was cleaned by soaking in a solution of concentrated $H_2SO_4$ and Nochromix cleaner (Godax Laboratories, Inc.) for at least eight hours followed by thorough rinsing in Millipore water.

Thin TEM foils with a cross-sectional view of the partially dealloyed samples were prepared using a Hitachi FB-2100 focused ion beam (FIB) system. The damaged surface layers of the TEM foils, caused by high-energy Ga ions, were removed by gentle ion milling at the liquid nitrogen temperature. TEM and HREM observations were performed by employing a JEM-3010 Field Emission Gun (FEG) TEM and Phillips CM-300FEG. Both microscopes were operated at 300 kV and had a point-to-point resolution better than 0.17 nm.

Fuel cell catalyst powder was made by ball milling np-NiPt foils that had been fully dealloyed followed by reduction of any surface oxides in dilute $H_2SO_4$; stainless steel ball bearings were used as the milling media. Once the average particle size was around 500 nm, checked by scanning electron microscope (SEM), the catalyst particles were suspended by ultrasonication for 20 min. in a mixture of isopropanol (IPA) and water with a vol/vol ratio of 3:1 IPA:H$_2$O. Once the catalyst particles were fully suspended in the solution, carbon black (XC-72R, Cabot) was added in an amount that makes the total solids in solution 70 wt. % np-NiPt and 30 wt. % C. This mixture was then sonicated for another 20 min. Nafion was added to the solution in the form of a 5 wt. % solution (Ion Power) in IPA in an amount that resulted in a Nafion content in the solid catalyst layer of 30 wt. %. The solution was then sonicated for a final 30 min. The resulting ink was painted by hand onto Kapton (McMaster Carr) decals layer by layer, allowing each layer to dry thoroughly before application of the subsequent layer, until the desired loading of 0.5 mg$_{catalyst}$/cm$^2$ was achieved. The catalyst layer was then transferred from the loaded decals to a dry Nafion 115 (Alfa Aesar) membrane by hot-pressing at 150° C. with a pressure of 30 MPa for 60 seconds. Gas diffusion layers (GDLs) were pressed onto either side of the MEA which was then loaded into a fuel cell composed of 2 cm thick stainless steel flow plates with a serpentine flow pattern. The fuel cell was operated with a stack temperature of 80° C. and 0.2 MPa of backpressure with oxygen and hydrogen humidification tank temperatures of 90° C. Polarization curves were taken using a Gamry Reference 3000 potentiostat.

While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention. It is intended, therefore, that the invention be defined by the scope of the claims that follow and that such claims be interpreted as broadly as is reasonable.

We claim:

1. A porous metal comprising platinum,
    wherein said porous metal comprises a crystalline network such that a pore size is smaller than a grain size,
    wherein said porous metal is a porous metal alloy further comprising nickel, and
    wherein said porous metal has a specific surface area that is greater than 5 m$^2$/g and less than 75 m$^2$/g.

2. The porous metal according to claim 1, wherein said porous metal alloy consists essentially of platinum (Pt) and nickel (Ni), and
    wherein said porous metal comprises a platinum-rich skin and an alloy core, said platinum-rich skin being richer in platinum than said alloy core.

3. The porous metal according to claim 2, wherein said porous metal alloy further satisfies the following formula $Pt_xNi_{1-x}$, wherein x is at least 0.6 and less than 1.

4. The porous metal according to claim 3, wherein x is 0.67.

5. The porous metal according to claim 4, wherein a density of said porous metal alloy is about 8 g/cm$^3$.

6. The porous metal according to claim 1, wherein said porous metal alloy further comprises a metal selected from the group of metals consisting of titanium, iron, cobalt, copper, iridium, rhenium, aluminum, manganese, palladium, osmium, rhodium, vanadium, chromium and combinations thereof.

7. The porous metal according to claim 1, wherein said porous metal has an ensemble average pore diameter that is less than about 10 μm.

8. The porous metal according to 1, wherein said porous metal has an ensemble average pore diameter that is less than 100 nm.

9. The porous metal according to claim 1, wherein said porous metal has an ensemble average pore diameter that is greater than 1 nm and less than 4 nm.

10. The porous metal according to claim 1, wherein said porous metal has an ensemble average pore diameter that is greater than 2 nm and less than 3 nm and an average ligament diameter that is greater than 2 nm and less than 3 nm.

11. The porous metal according to claim 1, wherein said specific surface area is greater than 40 m$^2$/g and less than 50 m$^2$/g.

12. The porous metal according to claim 1, wherein said specific surface area is about 44 m$^2$/g.

13. The porous metal according to claim 1, wherein said porous metal is a catalyst for oxygen reduction.

14. The porous metal according to claim 1, wherein said pore size of said porous metal is orders of magnitude smaller than said grain size.

15. A fuel cell, comprising:
    a first electrode;
    a second electrode spaced apart from said first electrode; and
    an electrolyte arranged between said first and said second electrodes,
    wherein at least one of said first and second electrodes is coated with a porous metal catalyst for oxygen reduction,
    wherein said porous metal catalyst is a porous metal alloy comprising nickel,
    wherein said porous metal catalyst comprises platinum,
    wherein said porous metal catalyst comprises a crystalline network such that a pore size is smaller than a grain size, and
    wherein said porous metal catalyst has a specific surface area that is greater than 5 m$^2$/g and less than 75 m$^2$/g.

16. The fuel cell according to claim 15, wherein said porous metal alloy consists essentially of platinum (Pt) and nickel (Ni), and
    wherein said porous metal catalyst comprises a platinum-rich skin and an alloy core, said platinum-rich skin being richer in platinum than said alloy core.

17. The fuel cell according to claim 16, wherein said porous metal alloy further satisfies the following formula $Pt_xNi_{1-x}$, wherein x is at least 0.6 and less than 1.

18. The fuel cell according to claim 15, wherein said pore size of said porous metal catalyst is orders of magnitude smaller than said grain size.

* * * * *